United States Patent

[11] 3,558,072

[72] Inventor Shigeo Wakahara
        Kanagawa-ken, Japan
[21] Appl. No. 781,311
[22] Filed Dec. 5, 1968
[45] Patented Jan. 26, 1971
[73] Assignee Nippon Kogaku K. K.
        Tokyo, Japan
        a corporation of Japan
[32] Priority Dec. 13, 1967
[33] Japan
[31] utility model 42/104608

[54] ADAPTER FOR 8 MM MOVIE PROJECTOR
    2 Claims, 4 Drawing Figs.
[52] U.S. Cl. .................................................. 242/68.3
[51] Int. Cl. .......................................................... B65h 17/02
[50] Field of Search............................................. 242/68.3

[56] References Cited
UNITED STATES PATENTS
3,326,489  6/1967  Lessler ......................... 242/68.3
3,375,995  4/1968  Roman.......................... 242/68.3

Primary Examiner—Nathan L. Mintz
Attorney—Harry G. Shapiro

ABSTRACT: The present invention provides a reel adapter for 8 mm movie projector, and the improvement resides in the provision of a groove and flange portion formed on an adapter ring and a projection formed on the reel stopper plate so that the adapter ring can be stopped when the reel stopper plate is raised or lowered optionally, and the adapter ring can also be stopped when the reel for the super 8 mm film is inserted or removed.

PATENTED JAN26 1971 3,558,072

INVENTOR.
SHIGEO WAKAHARA
BY
Harry S. Shapiro
ATTORNEY

ADAPTER FOR 8 MM MOVIE PROJECTOR

This invention relates to a structure of reel adapter for an 8 mm movie projector.

The hole diameter of the reel for a regular 8 mm movie projector is 8 mm and that of the reel for super 8 mm movie projector is 12.7 mm. Therefore, in a movie projector which can be used for both regular 8 mm film and super 8 mm film, it is necessary to mount the reels of different hole diameters as mentioned above. In order to solve this problem, an adapter has been used which has an internal diameter of 8 mm and an outer diameter of 12.7 mm. When a reel of super 8 mm film is used, such adapter is mounted on the reel receiver shaft, and the reel is mounted thereon, as is well known to those skilled in the art.

With the known adapter as above described, there is the likelihood that the adapter will be removed together with the reel when the reel of super 8 mm film is removed. Thus, when another reel of supper 8 mm film is to be mounted on the projector it becomes necessary to remount the adapter upon the reel receiving shaft.

The object of the invention is to provide an adapter which is constructed to be removably retained upon the reel receiving shaft so that reels of supper 8 mm film may be mounted and removed without withdrawing the adapter with the removal of a reel and thereby necessitating the replacement of the adapter upon the reel receiving shaft when a reel is replaced.

This invention will be described more clearly referring to the illustrative embodiment shown in the attached drawings, in which.

Figure 1:
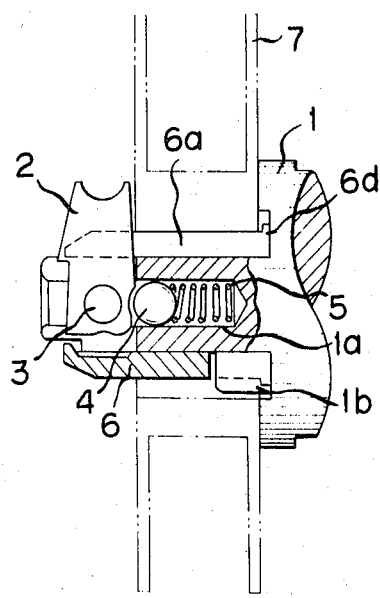
FIG. 1 is a cross-sectional view showing an embodiment of this invention.
Figure 2:
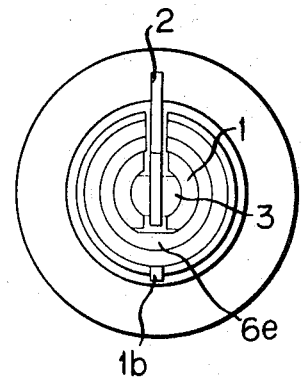
FIG. 2 is an end view of the left side of the device shown in FIG. 1.
Figure 3:
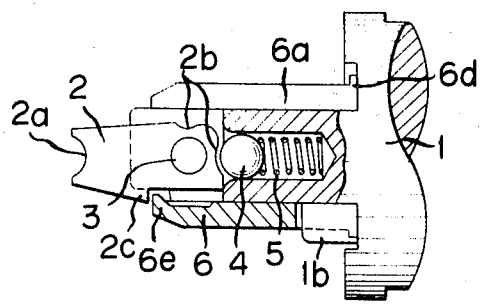
FIG. 3 is a view similar to FIG. 1 but showing the condition of the device when a reel is to be removed from or mounted on the reel receiving shaft having the adapter thereon.

In FIG. 1 through FIG. 3, 1 is a reel receiving shaft capable of mounting the reel having a hole of 8 mm diameter, 2 is a reel stopper plate and is supported rotatably on the reel receiving shaft 1 by a shaft 3. The steel ball 4 is positioned in a bore 1a provided in the reel receiving shaft 1. The ball is resiliently urged against the reel stopper plate 2 by a coiled spring 5. The reel stopper plate is provided with concave surfaces 2b to respectively receive the spring mounted ball 4 in the respective positions of the reel stopper plate as shown in FIGS. 1 and 3 to resiliently maintain the stopper plate in such positions. The stopper plate is also provided with a concave surface 2a to facilitate the engagement of the stopper plate by a finger for the rotation of the plate from the position shown in FIG. 1 to the position shown in FIG. 3 and vice versa. The stopper plate is provided with a projection 2c as shown.

Figure 4:
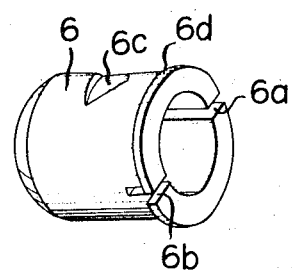
FIG. 4 is a perspective view of the adapter ring of this invention.

As best shown in FIG. 4, the adapter ring 6 is made with an internal diameter of about 8 mm and an outer diameter of about 12.7 mm. The adapter ring is provided with a longitudinally extending groove or slot 6a. On the diametric opposite side, a shortened groove or slot 6b is provided for mating cooperation with a key 1b formed on the reel receiving shaft 1, whereby a reel 7 mounted on the adapter ring will rotate with the reel receiving shaft. The adapter ring also is provided with a finger pit to enable the removal of the adapter from the reel receiving shaft, and for this purpose the outer surface of the adapter is provided with an indentation or cutout portion 6c. One end of the adapter is provided with an external flange portion 6d, the outer diameter of which is larger than 12.7 mm. At the opposite end of the adapter, an internal projection or jaw portion 6e is provided for cooperation with the projection 2c formed on the reel stopper plate 2 (see FIG. 3).

The adapter 6 is mounted upon the reel receiving shaft 1 as follows. With reel stopper plate 2 in the position shown is FIG. 1, the groove or slot 6a is aligned with the stopper plate and moved in an axial direction onto the reel receiving shaft until the flange 6d abuts the adjoining wall of the shaft as shown in FIG. 1.

To mount a reel 7 of super 8 mm film, the reel stopper plate 2 is lowered by rotating it from the position shown in FIG. 1 to the position shown in FIG. 3. The reel is moved axially over onto the adapter 6 and the reel stopper plate is rotated to the position shown in FIG. 1. In this condition, the reel 7 is confined between the external flange 6d of the adapter on one side and by the stopper plate 2 on the other side. Upon rotating or lowering the stopper plate 2 to the position shown in FIG. 3, the reel 7 may be removed. The adapter 6 is retained on the reel supporting shaft 1 as the reel 7 is removed because the projection 2c is in the path of the projection 6e of the adapter. To remove the adapter 6 so that a reel with regular 8 mm film may be positioned onto the reel supporting shaft, the reel stopper plate 2 is raised to the position shown in FIG. 1, whereupon positioning one's finger in the indentation 6 permits separation of the adapter from the shaft.

I claim:

1. A reel adapter for an 8 mm movie projector comprising a reel stopper plate provided on a reel receiving shaft for mounting a reel of regular 8 mm film having a small hole diameter, said reel stopper plate being formed in such a manner that the reel stopper plate can be raised in a direction perpendicular to the axial direction of the reel receiving shaft to stop the reel when the reel of the regular 8 mm film is mounted on the reel receiving shaft; an adapter ring for mounting a reel of super 8 mm film whose hole is larger in diameter than that of a regular 8 mm film reel in such a manner that the adapter ring can be mounted on said reel receiving shaft whereby said reel for super 8 mm film can be stopped by said reel stopper plate, the improvement comprising a groove and a flange portion formed on the adapter ring and a projection formed on the reel stopper plate so that the adapter ring can be stopped when the reel stopper plate is raised or lowered optionally, and the adapter ring is retained upon the reel receiving shaft when a reel of supper 8 mm type film is removed.

2. A reel adapter as set forth in claim 1, wherein the groove extends the length of the adapter ring and is of a width to receive the reel stopper plate when the stopper plate is in raised position; wherein the flange portion extends externally of the adapter ring and is located on the side of a reel having super 8 mm film thereon opposite the side of the reel confined by the raised stopper plate; and wherein the adapter ring is provided with an internal projection at the end thereof opposite the end where the external flange is located, said internal projection being cooperable with the projection formed on the reel stopper plate in the lowered position of the reel stopper plate.